June 4, 1963

G. ALFIERI 3,092,422

AUTOMATIC RELAY VALVE MEANS FOR PNEUMATIC BRAKING INSTALLATIONS

Filed June 23, 1960

INVENTOR.
GIUSEPPE ALFIERI

June 4, 1963

G. ALFIERI 3,092,422

AUTOMATIC RELAY VALVE MEANS FOR PNEUMATIC BRAKING INSTALLATIONS

Filed June 23, 1960

INVENTOR.
GIUSEPPE ALFIERI

United States Patent Office 3,092,422
Patented June 4, 1963

3,092,422
AUTOMATIC RELAY VALVE MEANS FOR PNEU-
MATIC BRAKING INSTALLATIONS
Giuseppe Alfieri, Milan, Italy, assignor to Fabbrica Italiana Magneti Marelli S.p.A., Milan, Italy, a firm
Filed June 23, 1960, Ser. No. 38,256
Claims priority, application Italy June 26, 1959
4 Claims. (Cl. 303—29)

This invention relates to an automatic relay valve for pneumatic braking installations of trailers and other towed vehicles.

It is commonly known to those skilled in the art to which this invention pertains that automatic relay valves for trailer pneumatic braking systems have been provided with devices for simultaneously actuating all of the braking units or sections of the trailer. Under these known arrangements when the trailer is uncoupled from the towing vehicle, all of the braking units of the trailer are actuated to brake the trailer. Although it is desirable to have all the wheels of the trailer braked while the trailer is being loaded or unloaded or if the trailer should be accidentially released from the towing vehicle, it has been found that when all the wheels of the trailer are braked, it is impossible to maneuver the trailer in order to couple it to the towing vehicle.

In my co-pending application, Serial No. 38,359, filed June 23, 1960, there is disclosed an improved automatic relay valve for pneumatic braking installations of towed vehicles of the general type discussed hereinabove but differing therefrom in that the service piston, which is subject to the pressure of air controlled by the service brake, together with the distributor piston associated therewith, move upwardly from the bottom of the device and the emergency piston moves downwardly from the top of the device. In other words, the service piston and the emergency piston are adapted to move in opposite directions from the bottom and the top of the device, respectively, towards the center thereof and, additionally, the valve assembly comprising an inlet valve and an outlet valve is mounted directly on the emergency piston.

In accordance with the present invention, the device of my aforementioned application, Serial No. 38,359, is combined with an auxiliary component constructed and arranged whereby the braking units associated with the front and rear wheels of the trailer may be applied and whereby both braking units may be released at one time or one braking unit may be released independent of the other.

An object of my invention is to provide an improved automatic relay valve for trailer pneumatic braking systems wherein the automatic relay valve is provided with means for applying the brake sections of a trailer and for releasing all the brake sections or only one section independent of the other.

A further object of my invention is to provide an improved automatic relay valve for trailer pneumatic braking systems wherein the automatic relay valve is provided with trailer brake actuating means operable manually or pneumatically for applying the brake units of the trailer and for releasing one of the brake units of the trailer independent of the other brake units whereby the coupling of the trailer to its truck may be easily accomplished.

Other objects and features of novelty of the invention will appear more clearly from the following detailed description taken in connection with the accompanying drawings. It is to be expressly understood, however, that the drawing is for purposes of illustration only and is not designed as a definition of the limits of the invention, reference being had for this purpose to the appended claims.

Figure 1:
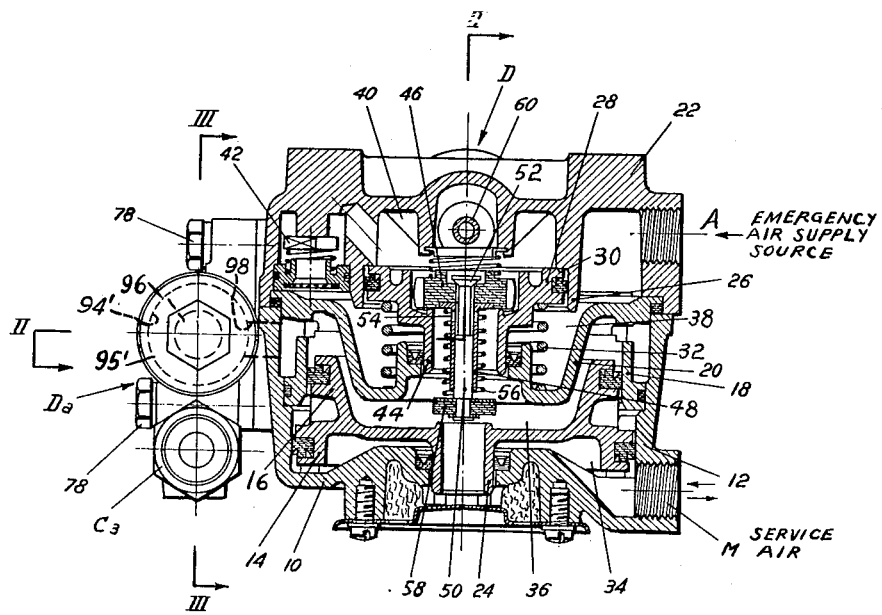
FIG. 1 is a sectional end view of the automatic relay valve.

Referring to the drawings and more particularly to FIG. 1, my improved automatic relay valve comprises a differential piston consisting of piston heads 14 and 16 carried by a piston rod 24 having an axial passage therein, the differential piston being mounted for reciprocating movement in the housing or body portion 12 of the device as will be described hereinafter. The service piston 14 is of greater diameter than the distributor piston 16 and is subjected to the pressure of the air in chamber 34 from a line M controlled by the service brake mounted on the truck.

A chamber 36 within the body portion of the device formed by means of a partition 20 and piston 16 is provided with an orifice $C_1$ for connection to the trailer rear braking units. Partition 20 is provided with an opening centrally thereof for receiving one end of a piston 28 which is slidably mounted in a cylinder 26 within the body portion 22, said end of piston 28 providing a seat for an inlet valve 46 of a double acting valve. A spring 32 is mounted between the partition 20 and piston 28 for biasing the piston upwardly into an abutting position against a shoulder 30 formed on the body portion 22. The double acting valve comprises a bushing 48 secured to the inlet valve 46, said bushing being provided with radial apertures 54. A stem 50 is slidably mounted within the bushing 48, one end of the stem having a valve 52 secured thereto and the opposite end having an exhaust valve 58 secured thereto, a spring 56 being mounted between the inlet valve 46 and exhaust valve 58 for biasing the valve 52 into closed position. By means of this construction and arrangement, chambers 36 and 40 are first put into communication through valve 52 and then through inlet valve 46.

The body portion 22 is further provided with a port A through which compressed air is delivered from the towing vehicle. The compressed air enters the chamber 48, formed by partition 20 and piston 28, through a check valve 42 and into a compressed air tank mounted on the trailer (not shown), and in communication with the body portion through a port S. When the trailer is coupled to the truck, fluid is supplied and exhausted through the service line M between the truck and trailer upon actuation of the truck brake pedal. When fluid is supplied to the line M, the differential piston 14—16 moves upwardly to unseat the inlet valve 46 and allow air to flow from the compressed air tank through port S into the chamber 36 and thence to the rear trailer brakes through port $C_1$. Upon the exhaust of fluid from line M, the differential piston moves downwardly, thus permitting the inlet valve 46 to become seated on one end of piston 28 and, at the same time, the end of the piston rod 24 moves away from the exhaust valve 58 of the double acting valve, whereby air from the rear trailer brakes port $C_1$ is exhausted to atmosphere through the axial passage in the piston rod 24 (and port $S_1$, FIG. 4). When the trailer is uncoupled from the towing vehicle, the chamber 38 is at atmospheric pressure and the pressure of the air in the chamber 40 forces the piston 28 downwardly to close the exhaust valve 58 and to subsequently open the inlet valve 46 whereby braking of the trailer is automatically accomplished.

Figure 2:
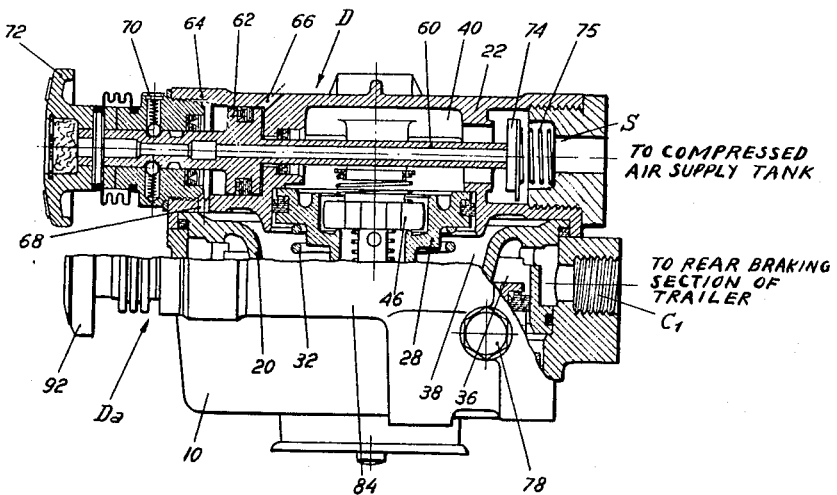
FIG. 2 is a sectional view taken along line II—II of FIG. 1.

In connection with the above description of the components for manual and automatic application of the brakes of the trailer, it will be understood that an additional component is provided for releasing the trailer brakes if desired when the trailer is uncoupled from the towing vehicle. This component, designated generally by D (FIG. 2), comprises essentially a control rod 60 provided with a hand grip 72, a check valve 74 positioned between the air tank, not shown, connected to the inlet S and the chamber 40, a piston 62 attached to the rod 60 slidable in a cylinder 64 formed in the body portion 22, said piston defining a front chamber permanently connected to atmosphere through a passage 66 and a rear chamber connected through a conduit 68 to chamber 38, chamber 38 being connected to an emergency air supply source through port A. One end of the rod 60 is provided with detent means 70 which retains the rod at two predetermined positions, one of which is shown in FIG. 2. The other end of rod 60 abuts the check valve 74, biased to a closed position by spring means 75, said valve controlling the communication between the chamber 40 and inlet S leading to the compressed air supply tank. When the handle 72 is pulled outwardly, the valve 74 closes the communication between chamber 40 and the inlet S and the chamber 40 is placed in communication with atmosphere through an axial passage formed in the rod 60. The brake release device as used to simultaneously actuate the braking units associated with all the wheels of the trailer is fully described in my co-pending application, Serial No. 38,359, referred to hereinabove, and reference herein to this device will be limited to its adaptation and use in connection with the application and release of selected braking units, when the trailer is uncoupled from the towing vehicle.

In order to selectively apply and release selected sections of the braking units of the trailer in acccordance with the present invention, two release components are provided. One of the components D is for controlling the front and rear braking sections of the trailer and another component Da is provided for controlling a braking section of the trailer which is selected to be actuated independently of the other section of the trailer. For purposes of illustration, it is assumed that the device Da controls the braking section provided for the front wheels of the trailer. As will be seen in FIG. 2, the chamber 36 is provided with a coupling $C_1$ for connecting the rear braking section controlled by the release device D and a coupling $C_3$ for connection to the front braking section of the trailer, which front section is independently controlled by the component Da.

Figure 3:
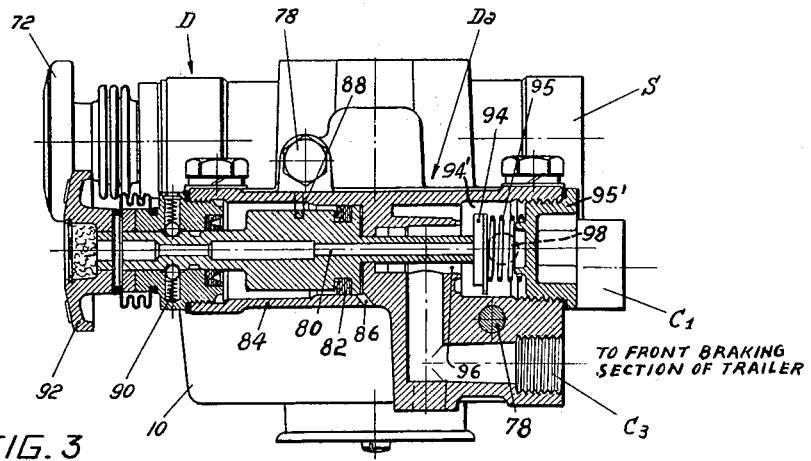
FIG. 3 is a sectional view taken along line III—III of FIG. 1.
Figure 4:
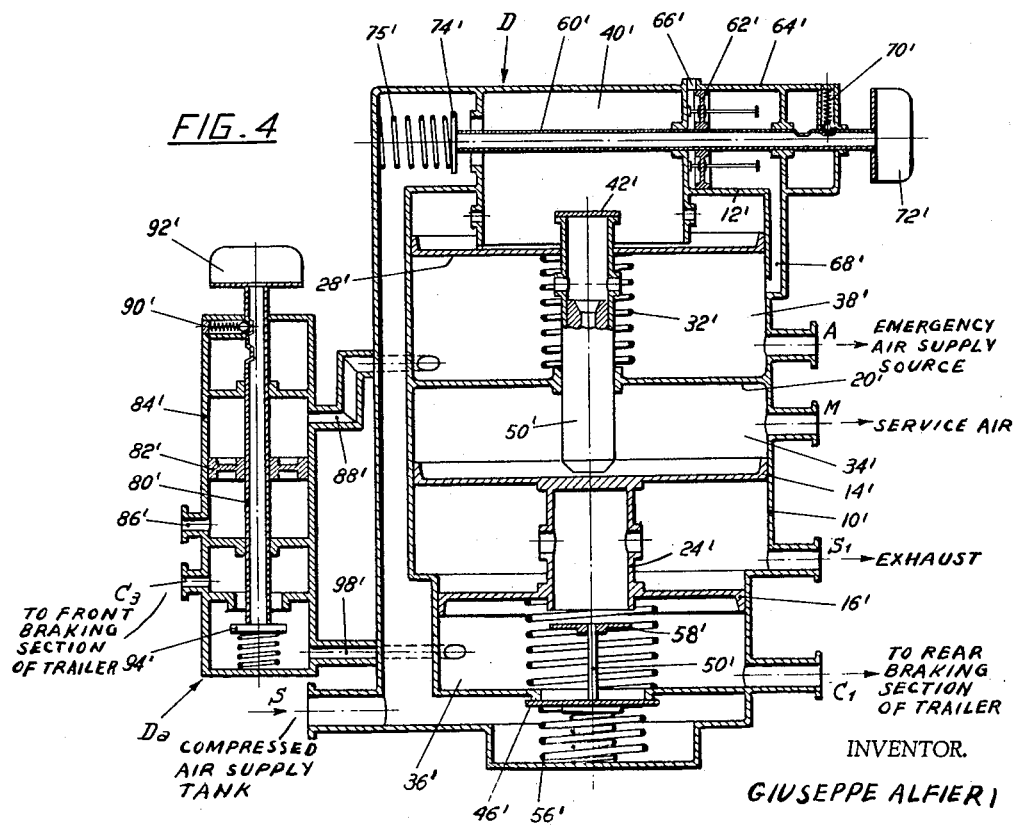
FIG. 4 is a sectional view showing the trailer brake actuating means applied to another type of automatic relay valve.

Referring to FIGS. 2, 3, and 4, the component Da is secured to the automatic relay valve by screws 78, or other suitable securing means. Connection through the component Da with the front section is through the coupling $C_3$, which leads into a chamber 96, which, through a valve 94 and a conduit 98 is connected to the chamber 36. The component Da comprises a rod 80 formed with a piston 82 slidably mounted within a cylinder 84, said piston defining a front chamber permanently connected to atmosphere through port 86, and a rear chamber connected to chamber 38 through conduit 88. The rod 80 is provided with detent means 90 for retaining the rod at two predetermined positions, said rod also being provided with a handle 92 for manually moving the rod to a predetermined position. The compressed air in chamber 38 passes through the conduit 88 into the rear chamber formed by piston 82 and cylinder 84, maintaining the valve 94 normally open, said valve being biased to a closed position by spring means 95 mounted between the valve and a cap 95' threaded into the housing, the valve being held in the open position by means of the detent 70, adapted to seat in an indentation formed in the rod 80.

When the trailer is uncoupled, all the trailer braking sections are actuated and blocked due to the fact that valve 52 is closed and piston 28 is lowered by means of the compressed air from the supply tank which passes through the valve 74. Piston 28 closes the exhaust valve 58 and opens inlet valve 46. To release the front and rear braking sections, the handle 72 of the device D is pulled outwardly, whereby the valve 74 closes the air passage from the supply tank to the braking sections connected to the coupling $C_1$ and the air from the braking section is exhausted to atmosphere through the axial passage in rod 60.

To release the front braking sections, the rod 80 is pulled outwardly by means of the handle 92; the valve 94 is seated and the air from the front wheel braking section connected to the coupling $C_3$ is discharged through the axial passage in the rod 80; thus releasing the front wheel brakes of the trailer. The front wheels can be again braked by resetting the handle 92 to its starting position as shown in FIG. 3. The latter movement is automatically accomplished by the pressure of the air in chamber 38 when the trailer is coupled to the towing vehicle, such pressure acts through conduit 88, on piston 82 moving the rod 80 inwardly thereby opening valve 94.

In the embodiment shown in FIG. 4, the elements are identical to those of FIGS. 1 to 3 but distinguished by primed reference numerals.

While I have shown and described an embodiment of my invention, it will be understood that numerous changes in size, design, shape, number and proportion of the various parts may be made, and particularly that the relationship of the various parts may be modified while retaining the advantages and essential functions of the structure without departing from the spirit of my invention as defined in the appended claims.

In the claims:

1. A compressed air automatic relay valve for pneumatic braking systems of towed vehicles comprising a housing, a partition mounted within the housing, a service brake line connected to one end of the housing, service piston means slidably mounted within the housing on one side of the partition, the service piston defining a first chamber with said one end of the housing and a second chamber with the partition, first and second ports formed in the housing connecting the towed vehicle's front and rear braking sections, respectively, to the second chamber, emergency piston means slidably mounted in the housing on the other side of the partition thereby defining a third chamber with the partition and a fourth chamber with the other end of the housing, an emergency air pressure supply line connected to the third chamber, a port formed in the housing for supplying compressed air to the fourth chamber, double acting valve means carried by the emergency piston adapted to be actuated by the service piston means, whereby upon movement of the service piston means in one direction the valve means is opened thereby allowing compressed air to flow from the fourth chamber into the second chamber to the front and rear braking sections of the towed vehicle, and upon movement of the service piston means in the opposite direction the compressed air exhausts from the braking sections to the atmosphere, first hand controlled brake release means operatively connected to the compressed air supply port for controlling the flow of compressed air to the front and rear braking sections of the towed vehicle, and second hand controlled brake release means operatively connected to one of the ports connecting one of the towed vehicle brake units to the second chamber, whereby when the first hand controlled brake release means is in an operative position, causing all the brake sections of the towed vehicle to be engaged, the second hand controlled brake release means may be actuated for selectively and independently releasing and applying a selected brake unit of the towed vehicle.

2. A compressed air automatic relay valve for pneumatic braking systems of towed vehicles in accordance with claim 1 wherein the second hand controlled brake release comprises valve means and a hollow actuating rod operatively connected to said valve means whereby upon inward movement of the actuating rod toward said valve means the respective brake unit is applied and upon outward movement of the actuating rod with respect to said valve means the respective brake unit is released.

3. A compressed air automatic relay valve for pneumatic braking systems of towed vehicles in accordance with claim 2 wherein piston means is secured to said actuating rod whereby compressed air from the emergency air supply line acts against the piston thereby moving the actuating rod to open the valve means when the towed vehicle is coupled to the towing vehicle.

4. A compressed air automatic relay valve for pneumatic braking systems of towed vehicles in accordance with claim 2 wherein the actuating rod is provided with detent means for maintaining the actuating rod inwardly toward said valve means when the towed vehicle is uncoupled from the towing vehicle.

References Cited in the file of this patent

UNITED STATES PATENTS

| | | |
|---|---|---|
| 2,062,500 | Casler et al. | Dec. 1, 1936 |
| 2,322,823 | Brown | June 29, 1943 |
| 2,367,194 | Boldt | Jan. 16, 1945 |
| 2,645,239 | Horn et al. | July 14, 1953 |
| 2,759,569 | Keehn | Aug. 21, 1956 |